US012747386B2

(12) United States Patent
Hanson et al.

(10) Patent No.: US 12,747,386 B2
(45) **Date of Patent: *Sep. 29, 2026**

(54) SURFACE TREATMENT COMPOSITIONS USED FOR CARBON SEQUESTRATION, HYDRAULIC FRACTURING AND INCREASING OIL PRODUCTION FROM A SUBTERRANEAN FORMATION, AND METHOD OF HYDRAULIC FRACTURING

(71) Applicant: ACULON, INC., San Diego, CA (US)

(72) Inventors: Eric L. Hanson, Carlsbad, CA (US); Majid Monji, San Diego, CA (US); Elizabeth Cambre, Texas City, TX (US); Edward Hughes, San Diego, CA (US)

(73) Assignee: ACULON INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/043,978

(22) Filed: Feb. 3, 2025

(65) Prior Publication Data

US 2025/0179348 A1 Jun. 5, 2025

Related U.S. Application Data

(62) Division of application No. 18/205,400, filed on Jun. 2, 2023, now Pat. No. 12,215,278.

(60) Provisional application No. 63/348,251, filed on Jun. 2, 2022.

(51) Int. Cl.

| | |
|---|---|
| ***E21B 43/267*** | (2006.01) |
| ***C09K 8/60*** | (2006.01) |
| ***C09K 8/62*** | (2006.01) |
| ***C09K 8/80*** | (2006.01) |
| ***C09K 8/82*** | (2006.01) |
| ***E21B 41/00*** | (2006.01) |

(52) U.S. Cl.

CPC .................. *C09K 8/60* (2013.01); *C09K 8/62* (2013.01); *C09K 8/80* (2013.01); *C09K 8/82* (2013.01); *E21B 41/0064* (2013.01); *E21B 43/267* (2013.01)

(58) Field of Classification Search

None

See application file for complete search history.

(56) References Cited

U.S. PATENT DOCUMENTS

| | | | | |
|---|---|---|---|---|
| 12,215,278 | B2 * | 2/2025 | Hanson .................... | C09K 8/64 |
| 2004/0177957 | A1 | 9/2004 | Kalfayan | |
| 2006/0065396 | A1 | 3/2006 | Dawson | |
| 2007/0254814 | A1 | 11/2007 | Kotlar | |
| 2015/0083417 | A1 * | 3/2015 | Lant ......................... | C09K 8/60 166/279 |
| 2018/0251583 | A1 | 9/2018 | Hanson et al. | |

* cited by examiner

*Primary Examiner* — Andrew Sue-Ako

(74) *Attorney, Agent, or Firm* — Blynn L. Shideler; Krisanne Shideler; BLK Law Group

(57) ABSTRACT

The present invention provides methods of increasing oil production, hydraulic fracturing, and carbon sequestration in subterranean formations. Surface treatment compositions used in these methods are also disclosed. The methods comprise: (1) injecting into the well the surface treatment composition with or without a pretreatment; (2) allowing one or more components of the surface treatment composition to chemically bond to a surface of the subterranean formation; and (3) removing oil from the well or from one or more production wells that are in fluid communication with the well. The surface treatment composition comprises (a) a fluid comprising a hydrocarbon liquid, a supercritical fluid, and/or a liquefied gas; and (b) a surface modifying component. The component (b) comprises (i) an organometallic compound and (ii) an organosilane having halogen substituents. In carbon sequestration, the fluid (a) contains carbon dioxide.

19 Claims, No Drawings

SURFACE TREATMENT COMPOSITIONS USED FOR CARBON SEQUESTRATION, HYDRAULIC FRACTURING AND INCREASING OIL PRODUCTION FROM A SUBTERRANEAN FORMATION, AND METHOD OF HYDRAULIC FRACTURING

RELATED APPLICATION

The present invention is a divisional of U.S. patent application Ser. No. 18/205,400, filed Jun. 2, 2023, and titled "Methods of Increasing Oil Production from a Subterranean Formation, Method of Hydraulic Fracturing, and Surface Treatment Compositions Used Therein", which in turn claims the benefit of provisional Patent Application Ser. No. 63/348,251, filed Jun. 2, 2022, and titled "Methods of Increasing Oil Production from a Subterranean Formation, Method of Hydraulic Fracturing, and Surface Treatment Compositions Used Therein". Both applications are incorporated herein by reference in their entireties.

FIELD OF THE INVENTION

The present invention relates to methods of increasing oil production, hydraulic fracturing, and carbon sequestration in subterranean formations. Treatment compositions used in these methods are also disclosed.

BACKGROUND OF THE INVENTION

Enhanced oil recovery (EOR) processes are implemented to increase the ability of oil to flow to and be produced from a well by injecting water, chemicals, or gases into the reservoir or by changing the physical properties of the oil. The ultimate objective is to produce additional amounts of oil left behind after primary and secondary production. EOR processes include thermal, chemical, and miscible methods. They are designed to recover oil left behind after primary and secondary recoveries by improving oil displacement efficiency and volumetric sweep efficiency. The reservoirs that are prime candidates for EOR include heavy oil reservoirs, unconventional reservoirs, and heterogeneous reservoirs. EOR processes often require substantial financial investments initially and are associated with high operating costs and risks. According to *Enhanced Oil Recovery Market: Global Industry Trends, Share, Size, Growth, Opportunity and Forecast* 2023-2028 by the IMARC GROUP the Global FOR market size reached $54.7 billion in 2022 and some experts project this to reach $87.1 billion by 2028 and there is an expectation of increasing and expanding FOR methods and technologies.

Approximately 60-70% of the oil in place cannot be produced by conventional methods. Thus, FOR methods are gaining importance, in particular because of the limited worldwide resources of crude oil. FOR processes include chemical and gas floods, steam, combustion, and electric heating. Thermal recovery, gas injection and chemical injection are the most commonly used EOR techniques across the globe. Although most of the EOR technologies are currently used offshore, oil companies are developing technologies to expand onshore EOR methods. Gas floods, including immiscible and miscible processes, are usually conducted with injected fluids (carbon dioxide, flue gas, nitrogen, or hydrocarbon). Steam projects involve cyclic steam (huff and puff) or steam drive.

Selective wetting of subterranean surfaces can be a useful FOR process, and is used in efforts to reduce the production of water and aqueous fluids from oil and gas wells. Surfactant flooding as a method of selective wetting has been attempted, but because typical surfactants do not chemically bond to the siliceous or metal oxide-containing surfaces found in subterranean formations, the surfactants may contaminate ground water. The challenge with most selective wetting coating chemistries is providing performance benefits while simultaneously offering the ability to bond to surfaces; often coatings that bond to surfaces have decreased selective wetting properties, and coatings that provide good selective wetting do not bond effectively to a substrate.

It would be desirable to provide methods of increasing oil production, hydraulic fracturing, and carbon sequestration in subterranean formations using treatment compositions that overcome the drawbacks of the prior art.

SUMMARY OF THE INVENTION

The present invention provides a surface treatment composition comprising:

(a) a fluid comprising a hydrocarbon liquid, a supercritical fluid, and/or a liquefied gas; and (b) a surface modifying component comprising:

(i) an organometallic compound comprising tantalum, titanium, zirconium, lanthanum, hafnium, and/or tungsten, wherein the organometallic compound (i) is present in the surface treatment composition in an amount of 0.005 to 2.5 percent by weight, based on the total weight of the surface treatment composition; and (ii) an organosilane having halogen substituents, wherein the organosilane (ii) is present in the surface treatment composition in an amount of 0.005 to 25 percent by weight, based on the total weight of the surface treatment composition.

The present invention provides a method of increasing oil production from and hydraulic fracturing in a siliceous or metal (M) oxide-containing subterranean formation penetrated by a well are provided. The methods comprise:

(1) injecting into the well the surface treatment composition described above at an injection pressure;

(2) allowing one or more components of the surface treatment composition to chemically bond to a surface of the subterranean formation; and (3) removing oil from the well or from one or more production wells that are in fluid communication with the well.

Also provided are methods of carbon sequestration within a siliceous or metal (M) oxide-containing subterranean formation penetrated by a well, the method comprising:

(1) injecting into the well a carbon-containing surface treatment composition at an injection pressure, wherein the carbon-containing surface treatment composition comprises:

(a) a carbon dioxide-containing fluid comprising a carbon dioxide-containing hydrocarbon liquid, supercritical carbon dioxide, and/or a carbon dioxide-containing liquefied gas; and (b) a surface modifying component comprising:

(i) an organometallic compound comprising tantalum, titanium, zirconium, lanthanum, hafnium, and/or tungsten, wherein the organometallic compound (i) is present in the surface treatment composition in an amount of 0.005 to 2.5 percent by weight, based on the total weight of the surface treatment composition; and (ii) an organosilane having halogen substituents, wherein the organosilane (ii) is present in the surface treatment composition in an amount of 0.005 to 25 percent by weight, based on the total weight of the surface treatment composition;

(2) allowing one or more components of the surface treatment composition to chemically bond to a surface of the subterranean formation.

Also provided is a method of increasing oil production from a siliceous or metal (M) oxide-containing subterranean formation penetrated by a well, the method comprising:

(a) injecting into the well a pretreatment composition that can displace both brine and oil from surfaces and pores of the formation to expose reactive silicate and/or metal oxide on the surfaces in the formation;

(b) injecting into the well an at least partially hydrolyzed organosiloxane compound dissolved in a solvent;

(c) allowing the organosiloxane compound to chemically bond to the reactive silicate and/or metal oxide on the surfaces and pores in the formation; and (d) removing oil from the well.

These and other advantages of the present invention will be clarified in the following description of the invention.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent.

The various aspects and examples of the present invention as presented herein are each understood to be non-limiting with respect to the scope of the invention.

As used in the following description and claims, the following terms have the meanings indicated below:

The term "reactive" refers to a functional group capable of undergoing a chemical reaction with itself and/or other functional groups spontaneously or upon the application of heat or in the presence of a catalyst or by any other means known to those skilled in the art.

The terms "on", "appended to", "affixed to", "bonded to", "adhered to", or terms of like import means that the designated item, e.g., a coating, film or layer, is either directly connected to the object surface, or indirectly connected to the object surface, e.g., through one or more other coatings, films or layers.

The present invention provides methods of increasing oil production and hydraulic fracturing ("fracking") in a siliceous or metal (M) oxide-containing subterranean formation penetrated by a well. The methods comprise: (1) injecting into the well (i. e., an injection well) a surface treatment composition at an injection pressure; (2) allowing one or more components of the surface treatment composition to chemically bond to a surface of the subterranean formation; and (3) removing oil from the well or from one or more production wells that are in fluid communication with the well. One or more of the wells may have been previously hydraulically fractured.

The methods of the present invention may be utilized, for example, in "huff and puff" or remediation processes. "Huff and puff" is a slang term for a cyclic process in which a well is injected with a recovery enhancement fluid and, after a soak period, the well is put back on production. Examples of huff and puff processes include cyclic steam injection and cyclic $CO_2$ injection. In the method of the present invention, when used as part of huff and puff or remediation processes, the injection pressure may be below the typical fracturing pressure but above a minimum reservoir miscible pressure of the well. In the method of the present invention, when used as part of a huff and puff process, the oil may be removed from the well in an alternating injection and production process; i. e., steps (1) to (3) of the method of the present invention may be repeated one or multiple times.

The subterranean formations treated by the methods of the present invention may comprise pores having an average diameter less than one micron, often less than 500 nm. The surface treatment compositions used in the methods are capable of penetrating pores of these sizes to release and produce oil that is otherwise trapped therein.

The surface treatment compositions used in the methods of the present invention comprise (a) a fluid comprising a hydrocarbon liquid, a supercritical fluid, and/or a liquefied gas; and (b) a surface modifying component. Suitable hydrocarbon liquids include LNG (liquid natural gas), Y-Grade NGL (natural gas liquids), methane, ethane, propane, n-butane, isobutane, pentane, natural gasoline, aromatic solvent blends, and mixtures thereof. LNG is a naturally occurring hydrocarbon gas that has been cooled to a liquid state at −260° F. It is made up largely of methane, and is extracted during natural gas drilling and petroleum production. Y-Grade NGL is an unfractionated hydrocarbon mixture often comprising ethane, propane, n-butane, isobutane, and "pentane plus". Pentane plus comprises pentane, isopentane, and/or heavier weight hydrocarbons, for example hydrocarbon compounds containing at least one of C5 through C8+. Pentane plus may include natural gasoline. The Y-Grade NGL composition may vary depending on the source. Aromatic solvent blends include AROMATIC 100 and SOLVESSO 100, commercially available from Solvents & Petroleum Service, Inc., among other suppliers.

The fluid (a) may additionally or alternatively comprise a liquefied gas. Suitable liquefied gases often have a boiling point between −165° C. and 0° C. at atmospheric pressure. Examples of liquefied gases that may be used as the fluid (a) may include or contain $CO_2$ or nitrogen. Often the fluid (a) comprises at least one of $CO_2$ and methane. The $CO_2$ may be in the form of a supercritical fluid.

The surface modifying component (b) of the surface treatment composition comprises: (i) an organometallic compound. The organometallic compound (i) is usually derived from a metal or metalloid, often a transition metal, selected from Group III and Groups IIIB, IVB, VB and VIB of the Periodic Table. Transition metals are used most often, such as those selected from Groups IIIB, IVB, VB and VIB of the Periodic Table. Examples are tantalum, titanium, zirconium, lanthanum, hafnium and tungsten. Niobium is also a suitable metal. The organometallic compound (i) aids in binding the film-forming composition to siliceous or metal (M) oxide-containing substrates in subterranean formations; the organo group of the organometallic compound is believed to be reactive with groups on the surfaces being treated such as oxide and hydroxyl groups. Metal alkoxides are often used as the organometallic compound (i). For example, in the case of titanium and zirconium, the organometallic compound can include one or more of: a) alkoxylates of titanium and zirconium having the general formula $M(OR)_4$, wherein M is selected from Ti and Zr and R is C1-18 alkyl, and b) polymeric alkyl titanates and zirconates obtainable by condensation of the alkoxylates of (a), i. e., partially hydrolyzed alkoxylates of the general formula $RO[-M(OR)_2O—]_{x-1}R$, wherein M and R are as above and x is a positive integer.

In particular examples of the present invention, the organometallic compound (i) comprises a tantalum (V) compound having the structure:

$$Ta(O)_a(OR)_b(X)_c(OH)_d$$

wherein a, b, c, and d are each independently 0 to 5, a+b+c+d=5, each R is independently C1-18 alkyl, and X is a halide. For example, the tantalum (V) compound may have at least one of the structures: $Ta(OR)_5$, $TaX_5$, and $Ta(OR)_yX_z$, wherein y and z are each independently 0 to 5 and y+z=5. Particular examples of suitable organo groups of the organometallic compound are alkoxide groups containing from 1 to 18, usually 2 to 4 carbon atoms, such as ethoxide, propoxide, isopropoxide, butoxide, isobutoxide, tert-butoxide and ethylhexyloxide. Mixed groups such as alkoxide, acetyl acetonate and chloride groups can be used. An exemplary organometallic compound is tantalum (V) ethoxide.

The organometallic compound (i) is typically present in the surface treatment composition in an amount of at least 0.005 percent by weight, such as at least 0.01 percent by weight or at least 0.1 percent by weight, and at most 2.5 percent by weight, such as at most 2 percent by weight or at most 1.5 percent by weight, based on the total weight of the film-forming composition.

The surface modifying component (b) of the surface treatment composition further comprises: (ii) an organosilane having halogen substituents. Examples of suitable organosilane compounds include alkoxysilane functional compounds such as (3-trimethoxysilyl)propyl-2-bromo-2-methylpropionate, a betaine functional silane, or chlorodimethylperfluorooctyl silane. Usually the organosilane (ii) is present in the surface treatment composition in an amount of 0.005 percent by weight, such as at least 0.01 percent by weight or at least 0.1 percent by weight, and at most 25 percent by weight, such as at most 20 percent by weight or at most 15 percent by weight, based on the total weight of the surface treatment composition.

The surface treatment composition used in the methods of the present invention coat the surfaces of the subterranean formation and substantially reduce permeability to water within the formation without substantially reducing permeability to oil within the formation. It is believed that the surface treatment composition preferentially adsorbs a layer of water and repels wetting by oil and other hydrocarbons, thus contributing to increased oil production. Components in the surface treatment composition also react with (chemically bond to) reactive silicate and/or metal oxide on the surfaces and pores in the formation and do not readily migrate out of the formation.

The subterranean formation is treated using the surface treatment composition by introducing the surface treatment composition into the formation through a wellbore. The surface treatment compositions may be introduced into the subterranean formation in any amount suitable for contacting a portion of a reservoir matrix of flow pathways. By "introduced" it is meant that a surface treatment composition may be pumped, injected, poured, released, displaced, spotted, circulated or otherwise placed within a well, wellbore, and/or formation using any suitable manner known in the art. The injection pressure is often as high as 10,000 psi. In certain examples of the present invention, the fluid (a) and surface modifying component (b) of the surface treatment composition are pumped into the well together as a mixture.

Typically, the fluid (a) serves as a carrier for the surface modifying component (b). In other examples of the present invention, the surface treatment composition and a separate fluid are pumped into the well in alternating charges at least once. In this scenario, the separate fluid is usually charged first.

The separate fluid may comprise any of those disclosed above for use as the fluid (a) in the surface treatment composition, and may be the same as or different from the fluid (a) that serves as a carrier for the surface modifying component in the surface treatment composition. For example, the fluid (a) in the surface treatment composition may comprise an aromatic solvent blend while the separate fluid that is being charged alternately comprises $CO_2$. The pressure may be maintained for some time to allow for diffusion of the surface treatment composition into the small pores of the formation and reaction of the components with reactive silicate and/or metal oxide on the surfaces in the formation. Finally, displaced oil is removed from the well or from one or more production wells that are in fluid communication with the well.

When the fluid (a) used in any of the processes above and/or when the separate fluid used as an alternating charge comprises $CO_2$, the organosilane (ii) in the surface modifying component (b) may comprise functional groups that are compatible with, and even chemically attracted to, $CO_2$. Examples of such functional groups include amine, carbonyl and/or sulfonate functional groups. Not intending to be bound by theory, it is believed that such functional groups attract $CO_2$ preferentially to hydrocarbons or water.

In methods of hydraulic fracturing in accordance with the present invention, the surface treatment composition may further comprise a proppant. Proppant is a gritty material with uniformly sized particles that is typically mixed in with fracturing fluid during the hydraulic fracturing process to hold open fractures made in the ground. There are a variety of different types of proppant, including naturally occurring sand and man-made proppants. Man-made proppants include materials such as resin-coated sand or strong ceramic materials. Proppants come in a variety of different sizes and spherical shapes for a variety of different situations.

Other additives known in the art for use in stimulation and well treatments may be included in the surface treatment composition. For example, surfactants, thickeners, diversion agents, pH buffers, etc. may be used.

The resultant coating layer on surfaces within the formation is very thin, having a thickness of about 100 nanometers or less, such as 0.5 to 100 nanometers.

The FOR method utilizing $CO_2$ will serve as a carbon sequestration method, and this method may be used as a carbon sequestration process individually, that is, with or without enhancing oil recovery. Thus the present invention further provides a method of carbon sequestration within a siliceous or metal (M) oxide-containing subterranean formation penetrated by a well, the method comprising:

(1) injecting into the well a carbon-containing surface treatment composition at an injection pressure, wherein the carbon-containing surface treatment composition comprises:
 (a) a carbon dioxide-containing fluid comprising a carbon dioxide-containing hydrocarbon liquid, supercritical carbon dioxide, and/or a carbon dioxide-containing liquefied gas; and
 (b) a surface modifying component comprising:
  (i) an organometallic compound; and
  (ii) an organosilane having halogen substituents; and
(2) allowing one or more components of the surface treatment composition to chemically bond to a surface of the subterranean formation. In this embodiment of the invention, the fluid (a) contains carbon dioxide, used either by itself in the form of a liquefied gas as the fluid (a) or in combination with any of the hydrocarbon liquids and/or other liquefied gases disclosed above. The surface modifying component (b) comprises any of the organometallic compounds (i) and organosilanes having halogen substituents (ii) disclosed above, each in amounts as described above. As noted above, the method of carbon sequestration in accordance with the present invention may be used in an energized or an atomized fracking process. In such scenarios, the injection pressure used in step (1) is above the fracturing pressure.

The present invention further provides a method of increasing oil production from a siliceous or metal (M) oxide-containing subterranean formation penetrated by a well, the method comprising:

(a) injecting into the well a pretreatment composition that can displace both brine and oil from surfaces and pores of the formation to expose reactive silicate and/or metal oxide on the surfaces in the formation;
(b) injecting into the well an at least partially hydrolyzed organosiloxane compound dissolved in a solvent;
(c) allowing the organosiloxane compound to chemically bond to the reactive silicate and/or metal oxide on the surfaces and pores in the formation; and
(d) removing oil from the well.

The pretreatment composition typically comprises at least one of dipropylene glycol dimethyl ether; propylene glycol dimethyl ether, ethylene glycol dimethyl ether, and diethylene glycol dimethyl ether.

After pretreatment, an at least partially hydrolyzed organosiloxane compound dissolved in a solvent is pumped into the well. Suitable organosiloxanes include perfluorinated siloxanes such as 1H,1H',2H,2H'-perfluorooctyltrichlorosiloxane, dimethylperfluorooctyltrichlorosilane, decyltrimethoxysilane. Hydrolysis may be done as known in the art, using a C1 to C4 alcohol such as methanol, ethanol, n-propanol, isopropanol, etc. The at least partially hydrolyzed organosiloxane compound typically comprises oleophilic and hydrophobic functional groups (those best suited for oil-wet surfaces), or oleophobic and hydrophilic functional groups (those best suited for water-wet surfaces). Examples of oleophilic functional groups include t-butyl, methoxy, ethoxy, 2-ethylhexyl, dibutyl and so on. Examples of hydrophilic functional groups include glycols, ammonium halides, sulfonate salts, carboxylate salts, betaines, and so on.

After separation of excess alcohol from the organosiloxane compound, the at least partially hydrolyzed organosiloxane compound is dissolved in a solvent. The solvent in which the organosiloxane compound is dissolved may comprise a hydrocarbon. Examples include hydrocarbons such as paraffin and petroleum distillates containing hydrocarbon compounds with average chain lengths of C10 to C20. Commercially available solvents that are useful include BIOBASE available from Shrieve, and PATHFRAC, available from Exxon Mobil Chemical, Exxon Mobil Corporation.

The use of these small-molecule organosiloxanes in the present invention represents a radical departure from attempts in the prior art to modify formation surfaces. Previous attempts in the prior art to modify formation surfaces have relied on two different approaches: gas-phase adsorption of fluorocarbons, and solution-phase reaction of organometallic-polysiloxane compounds with siliceous rock surfaces. In contrast, after hydrolysis in alcohol followed by removal of excess alcohol, the small-molecule organosiloxanes can be redissolved in any of a multitude of different solvents prior to injection, including "safe" solvents such as the high-flash point solvents mentioned above.

In each of the methods described above, after components in the surface treatment composition have been allowed to react with compounds on the interior surfaces of the formation, displaced oil may be removed. The present invention described above provides methods of increasing oil production, hydraulic fracturing, and carbon sequestration in subterranean formations. The methods can reduce the carbon footprint associated with the formation.

Whereas particular embodiments of this invention have been described above for purposes of illustration, it will be evident to those skilled in the art that numerous variations of the details of the present invention may be made without departing from the scope of the invention as defined in the appended claims.

What is claimed is:

1. A method of hydraulic fracturing in a siliceous or metal (M) oxide-containing subterranean formation penetrated by a well, the method comprising:

(1) injecting into the well a surface treatment composition at an injection pressure wherein the surface treatment composition comprises:
 (a) a fluid comprising a liquefied gas that has a boiling point between −165° C. and 0° C. at atmospheric pressure; and
 (b) a surface modifying component comprising:
 (i) an organometallic compound comprising tantalum, titanium, zirconium, lanthanum, hafnium, and/or tungsten, wherein the organometallic compound (i) is present in the surface treatment composition in an amount of 0.005 to 2.5 percent by weight, based on the total weight of the surface treatment composition; and
 (ii) an organosilane having halogen substituents, wherein the organosilane (ii) is present in the surface treatment composition in an amount of 0.005 to 25 percent by weight, based on the total weight of the surface treatment composition;

(2) allowing one or more components of the surface treatment composition to chemically bond to a surface of the subterranean formation; and (3) removing oil from the well or from one or more production wells that are in fluid communication with the well.

2. The method of hydraulic fracturing according to claim 1, wherein the fluid (a) comprises at least one of LNG, Y-GRADE NGL, $CO_2$, methane, ethane, propane, n-butane, and isobutane.

3. The method of hydraulic fracturing according to claim 1, wherein the fluid (a) comprises at least one of $CO_2$ and methane.

4. The method of hydraulic fracturing according to claim 1, wherein the organometallic compound (i) comprises a tantalum (V) compound having the structure:

$$Ta(O)_a(OR)_b(X)_c(OH)_d$$

wherein a, b, c, and d are each independently 0 to 5, a+b+c+d=5, each R is independently $C_{1-18}$ alkyl, and X is a halide.

5. The method of hydraulic fracturing according to claim 4, wherein the tantalum (V) compound comprises tantalum (V) ethoxide.

6. The method of hydraulic fracturing according to claim 1, wherein the organosilane (ii) comprises a betaine functional silane or chlorodimethylperfluorooctyl silane.

7. The method of hydraulic fracturing according to claim 1, wherein the fluid (a) and surface modifying component (b) of the surface treatment composition are pumped into the well together as a mixture.

8. The method of hydraulic fracturing according to claim 1, wherein the surface treatment composition and a separate fluid are pumped into the well in alternating charges at least once, and wherein the separate fluid is charged first.

9. The method of hydraulic fracturing according to claim 1, wherein the fluid (a) comprises $CO_2$.

10. The method of hydraulic fracturing according to claim 1, wherein the subterranean formation comprises pores having an average diameter less than one micron.

11. The method of hydraulic fracturing according to claim 1, wherein the oil is removed from the well in an alternating injection and production process.

12. The method of hydraulic fracturing according to claim 1, wherein the surface treatment composition further comprises a proppant.

13. A method of hydraulic fracturing in a siliceous or metal (M) oxide-containing subterranean formation penetrated by a well, the method comprising:

(1) injecting into the well a surface treatment composition at an injection pressure wherein the surface treatment composition comprises:

(a) a fluid comprising a liquefied gas that has a boiling point between −165° C. and 0° C. at atmospheric pressure, and wherein the fluid (a) comprises at least one of LNG, Y-GRADE NGL, $CO_2$, methane, ethane, propane, n-butane, and isobutane; and (b) a surface modifying component comprising:

(i) an organometallic compound comprising tantalum, titanium, zirconium, lanthanum, hafnium, and/or tungsten, wherein the organometallic compound (i) is present in the surface treatment composition in an amount of 0.005 to 2.5 percent by weight, based on the total weight of the surface treatment composition; and (ii) an organosilane having halogen substituents, wherein the organosilane (ii) is present in the surface treatment composition in an amount of 0.005 to 25 percent by weight, based on the total weight of the surface treatment composition;

(2) allowing one or more components of the surface treatment composition to chemically bond to a surface of the subterranean formation; and (3) removing oil from the well or from one or more production wells that are in fluid communication with the well.

14. The method of hydraulic fracturing according to claim 13, wherein the oil is removed from the well in an alternating injection and production process.

15. The method of hydraulic fracturing according to claim 13, wherein the organometallic compound (i) comprises a tantalum (V) compound having the structure:

$$Ta(O)_a(OR)_b(X)_c(OH)_d$$

wherein a, b, c, and d are each independently 0 to 5, a+b+c+d=5, each R is independently $C_{1-18}$ alkyl, and X is a halide.

16. The method of hydraulic fracturing according to claim 15, wherein the tantalum (V) compound comprises tantalum (V) ethoxide.

17. The method of hydraulic fracturing according to claim 13, wherein the fluid (a) comprises at least one of $CO_2$ and methane.

18. The method of hydraulic fracturing according to claim 13, wherein the fluid (a) comprises $CO_2$.

19. The method of hydraulic fracturing according to claim 13, wherein the surface treatment composition and a separate fluid are pumped into the well in alternating charges at least once, and wherein the separate fluid is charged first.

* * * * *